March 20, 1956
D. S. FRIDGE, SR
2,738,528
PROPHYLACTIC DENTAL HANDPIECE
Filed Aug. 5, 1952
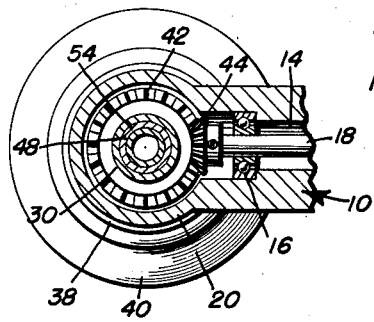
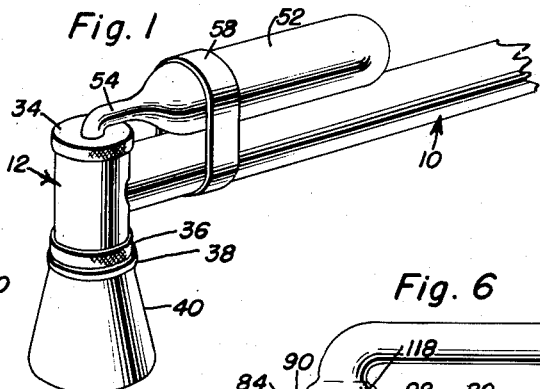
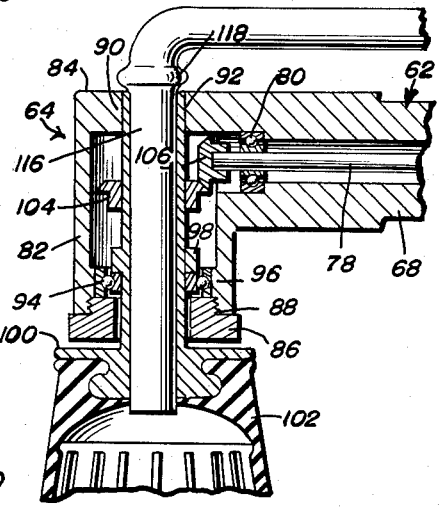
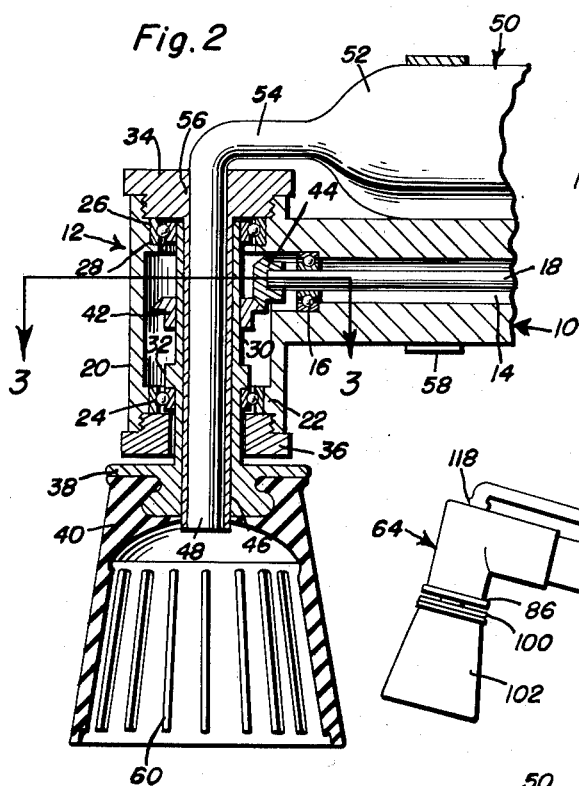
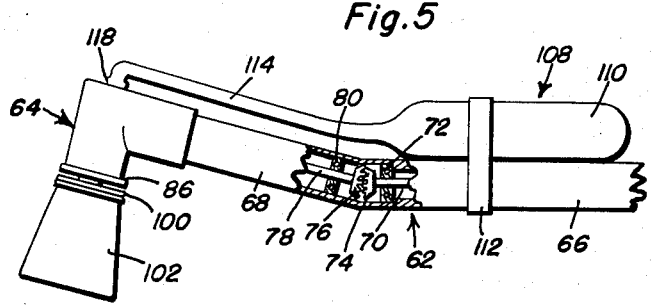
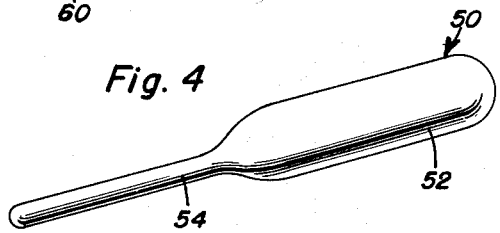
David S. Fridge, Sr.
INVENTOR.
BY *Clarence A. O'Brien
and Harvey B. Jacobson*
Attorneys United States Patent Office 2,738,528
Patented Mar. 20, 1956

2,738,528
PROPHYLACTIC DENTAL HANDPIECE
David S. Fridge, Sr., Mobile, Ala.

Application August 5, 1952, Serial No. 302,785

1 Claim. (Cl. 15—97)

This invention relates in general to dental equipment, and more specifically to a dental handpiece especially designed for use in cleaning teeth.

The primary object of this invention is to provide an improved dental handpiece utilized primarily for the cleaning of teeth, said handpiece being provided with means for supplying cleaning substance to a cleaning element being rotated thereby.

Another object of this invention is to provide an improved prophylactic dental handpiece for cleaning teeth, said handpiece being provided with means for supplying cleaning substance to a cleaning element thereof, said cleaning substance passing through a sanitary tube nonrotatably positioned within the handpiece.

Another object of this invention is to provide an improved dental handpiece which is provided with a cleaning substance supply, said handpiece being of a relatively simple construction and being so designed whereby it may be formed with conventional dental equipment and manufacturing machinery so as to be economically feasible.

A further object of this invention is to provide an improved reservoir which is adapted to contain a cleaning substance for cleaning teeth and which may be conveniently mounted on a dental handpiece for supplying substance to a revolving cleaning or scrubbing element thereof.

A still further object of the invention is to provide an improved reservoir which may be removably secured to a dental handpiece for supplying cleaning substance thereto for use during the operation of cleaning teeth, said reservoir including an elongated collapsible container having formed therewith an elongated L-shaped tube portion, said tube portion being adapted to have an end thereof disposed with a dental handpiece for supplying cleaning substance through a revolving shaft thereof.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application and in which:

Figure 1 is a perspective view of a preferred form of the invention and shows the general outline thereof;

Figure 2 is an enlarged fragmentary longitudinal vertical sectional view taken through the center of the dental handpiece of Figure 1 and shows the general construction thereof including the manner in which cleaning substance may be dispensed into the interior of the cleaning or scrubbing element;

Figure 3 is a transverse horizontal sectional view taken substantially upon the plane indicated by the section line 3—3 of Figure 2 and shows the arrangements of the various elements of the dental handpiece;

Figure 4 is a perspective view of a reservoir for containing and supplying cleaning substance to the dental handpiece of Figure 1;

Figure 5 is a side elevational view of a modified form of the invention which includes an off set handle, said handle being broken away and shown in section in order to clearly illustrate the gearing permitting the offsetting of the same; and Figure 6 is an enlarged fragmentary longitudinal vertical sectional view taken through the center of the head portion of the dental handpiece of Figure 5 and shows the general construction thereof.

Similar characters of reference designate similar or identical elements and portions throughout the specification and throughout the different views of the drawings.

Referring now to the drawings in detail, it will be seen that the preferred form of the invention, which is illustrated in Figures 1, 2 and 3, includes an elongated handle, which is referred to in general by the reference numeral 10, which has secured to the outer end thereof a head, which is referred to in general by the reference numeral 12.

The handle 10 is in the form of a tubular member having a central bore 14 therethrough. Extending through the bore 14 and supported therein by suitable bearings 16 for rotation is a drive shaft 18. It will be understood that the drive shaft 18 is connected to and driven by a power source (not shown) of any suitable nature.

The head 12 includes a tubular body portion 20 which may be either secured to the handle 10 or formed integral therewith. The body portion 20 includes an inwardly projecting annular flange 22 adjacent the lower end thereof which forms a seat for a suitable bearing 24. A second suitable bearing 26 is positioned adjacent the upper end of the body portion 20 and is seated within an inwardly projecting annular flange 28 positioned adjacent the upper end of the body portion 20.

Mounted within the head 12 and supported by the bearings 24 and 26 is a hollow driven shaft 30. The driven shaft 30 extends outwardly through the lower end of the head 12 and includes an outwardly projecting annular shoulder 32 intermediate its ends, the shoulder 32 being in engagement with the lower bearing 24 and supporting the driven shaft 30 against downward movement.

In order that upward movement of the driven shaft 30 may be limited, the upper end of the body portion 20 is closed by a removable cap 34 threadedly engaged therein. The removable cap 34 retains the upper bearing 26 in position and prevents upward movement of the driven shaft 30. A similar cap 36 is threadedly engaged in the lower end of the body portion 20 and engages the lower bearing 24 to prevent downward movement thereof. It will be understood that the caps 34 and 36 are in tight sealing relation with the body portion 20 so as to prevent the loss of lubricants from the head 12.

Carried by the lower end of the driven shaft 30 and being disposed below the cap 36 is an attaching lug 38. The attaching lug 38 has removably connected thereto a cleaning or scrubbing element 40 which is hollow and is intended to be utilized in the cleaning of teeth.

In order that the driven shaft 30 may be rotated, it is provided adjacent its upper end with a bevel gear 42. The bevel gear 42 is in engagement with a second bevel gear 44 carried by the drive shaft 18 on the end thereof disposed within the body portion 20. It will be seen that when the drive shaft 18 is rotated the attaching lug 38 and its associated scrubbing element 40 is also rotated along with the driven shaft 30.

It will be noted that the attaching lug 38 is provided with a bore 46 therethrough in alignment with the opening through the tubular driven shaft 30. Projecting downwardly through the tubular driven shaft 30 and the bore 46 is an elongated sleeve 48 which is integral with and projects downwardly from the underside of the cap 34. It will be noted that the sleeve 48 projects downwardly through the attaching lug 38 and has a lower end thereof disposed within the interior of the scrubbing element 40.

Secured to the upper side of the handle 10 adjacent the head 12 is a reservoir for cleaning substance, the reservoir being referred to in general by the reference numeral 50. The reservoir 50 includes an elongated container 52 which is secured to the handle 10 by a resilient strap 53. As is best illustrated in Figure 4, the container 52 has a dispensing tube portion 54 extending outwardly from one end thereof, the tube portion 54 being generally in alignment with the container 52.

The cap 34 is provided with a bore 56 therethrough in alignment with the bore of the sleeve 48 and a major part of the dispensing tube portion 54 is bent at substantially right angles to that part of the tube adjacent the container 52 and passed through the bore 56 and the interior of the sleeve 48. When so positioned, the dispensing end of the tube 54 is positioned at the lower end of the sleeve 48 and the interior thereof is communicated with the interior of the scrubbing element 40. In order that cleaning substance dispensed from the reservoir 50 may be retained within the scrubbing element 40 during a cleaning operation, the interior wall of the scrubbing element 40 is provided with a plurality of vertically extending circumferentially spaced ribs 60 which are adapted to retain cleaning substance.

The reservoir 50 is preferably formed of plastic in order that the dispensing tube 54 thereof may be conveniently bent and the container 52 collapsed to dispense cleaning substance contained therein. However, if it is so desired, other suitable material may be utilized in forming the reservoir 50.

Referring now to Figures 5 and 6 in particular, it will be seen that there is illustrated a modified form of dental handpiece. The modified form of dental handpiece includes a handle, which is referred to in general by the reference numeral 62, and a head, which is referred to in general by the reference numeral 64. The handle 62 includes a rear portion 66 and a front portion 68, the front portion 68 being angularly offset from the rear portion 66. Mounted within the rear portion 66 is a first drive shaft 70 supported by a suitable bearing 72 and driven by a suitable power unit (not shown). The forward end of the first drive shaft 70 is provided with a bevel gear 74 which is in engagement with a bevel gear 76 carried by the rear end of a second drive shaft 78. The second drive shaft 78 is positioned within the front portion 68 of the handle 62 and mounted for rotation in suitable bearings 80.

Referring now to Figure 6 in particular, it will be seen that the head 64 is integral with the front portion 68 of the handle 62. The head 64 includes a generally tubular body portion 82 whose upper end is closed by a top wall 84 and whose lower end is closed by a removable cap 86 threadedly engaged therein. The cap 86 is provided with a centrally located bore 88 which is aligned with a bore 90 through the top wall 84.

Passing through the bore 88 and having its upper end rotatably positioned within the bore 90 is a tubular driven shaft 92. The upper end of the driven shaft 92 is supported in the bore 90 and the lower end thereof is supported in a bearing 94 mounted within an inwardly projecting annular flange 96 integral with the body portion 82. It will be noted that the driven shaft 92 is provided intermediate its ends with an outwardly projecting annular shoulder 98 which engages the bearing 94 and limits downward movement of the same.

Carried by the lower end of the driven shaft 92 for rotation therewith is an attaching lug 100, which is of a construction identical to the attaching lug 38 and which is adapted to have removably mounted thereon scrubbing elements 102 which are identical to the scrubbing elements 40. In order that the scrubbing element 102 may be rotated for cleaning teeth, the driven shaft 92 is provided adjacent its upper end with a bevel gear 104. Mounted on the forward end of the second drive shaft 78 is a second bevel gear 106 which is in driving engagement with the bevel gear 104.

In order that cleaning substance may be dispensed into the interior of the scrubbing element 102, the dental handpiece is provided with a cleaning substance reservoir which is referred to in general by the reference numeral 108. The reservoir 108 includes a collapsible container 110 which is secured to the first portion 66 of the handle 62 by a resilient clamp 112. Extending forwardly from the container 110 is an elongated dispensing tube portion 114 which terminates in a downwardly directed end portion 116, the end portion 116 being substantially at right angles to the main part of the dispensing tube 114 and is disposed within the tubular driven shaft 92. The extreme lower end of the end portion 116 projects downwardly into the scrubbing element 102 and downward movement thereof is limited by a shoulder 118 adjacent its intersection with the main portion of the dispensing tube 114. It will be also noted that the dispensing tube 114 is curved adjacent its intersection with the container 110 in order to accommodate for the angular offsetting of the first and second portions of the handle 62.

Inasmuch as the end portion 116 is disposed within the rotating driven shaft 92, it is preferred that the reservoir 108 be formed of metal to prevent the wearing of the end portion 116 which remains stationary. The container 110 may be of a thin metal, such as the conventional collapsible toothpaste tube or the like, in order that the same may be conveniently collapsed to force cleaning substance through the dispensing tube 114 and into the scrubbing element 102. However, other suitable materials may be utilized for forming reservoir 108 if it is so desired.

In view of the foregoing, it will be seen that due to the novel constructions of the dental handpieces disclosed herein, cleaning substance may be dispensed directly into the scrubbing elements of the handpieces during a tooth cleaning operation. By dispensing the cleaning substances directly into the scrubbing elements there is no possibility of an unsanitary condition inasmuch as the cleaning substance passes directly from its reservoir into the mouth of the person whose teeth are being cleaned. It will be understood that the reservoirs may be made of any suitable size although it is preferred that each reservoir contain only sufficient cleaning substance for a single cleaning operation.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claim.

Having described the invention, what is claimed as new is:

A prophylactic dental hand piece including a hollow head having mounted therein for rotation and extending from one end thereof a driven shaft, a scrubbing element carried by said driven shaft below said head at said one end, said driven shaft being hollow and opening into said scrubbing element, a closure cap removably carried by said head and closing the opposite end thereof, a sleeve carried by said closure cap extending through said driven shaft and opening into said scrubbing element, an opening through said cap aligned with said sleeve, a handle secured to said head, a replaceable cleaning substance reservoir including a collapsible container having an L-shaped dispensing tube, said dispensing tube extending through said sleeve and opening into said scrubbing element for dispensing cleaning substance directly into said scrubbing element, said container resting on said handle and being releasably retained in place by a strap carried by said handle.

References Cited in the file of this patent

UNITED STATES PATENTS

| | | |
|---|---|---|
| 689,464 | Cramer | Dec. 24, 1901 |
| 1,759,075 | Wahl | May 20, 1930 |
| 1,881,129 | Peek | Oct. 4, 1932 |
| 2,072,620 | Fitch | Mar. 2, 1937 |
| 2,108,689 | Mock | Feb. 15, 1938 |
| 2,160,963 | Friden | June 6, 1939 |
| 2,226,145 | Smith | Dec. 24, 1940 |
| 2,400,912 | Britt | May 28, 1946 |